April 6, 1965
J. E. DIETRICH ETAL
3,176,554
LOAF SPLITTER
Filed Nov. 28, 1962
3 Sheets-Sheet 1
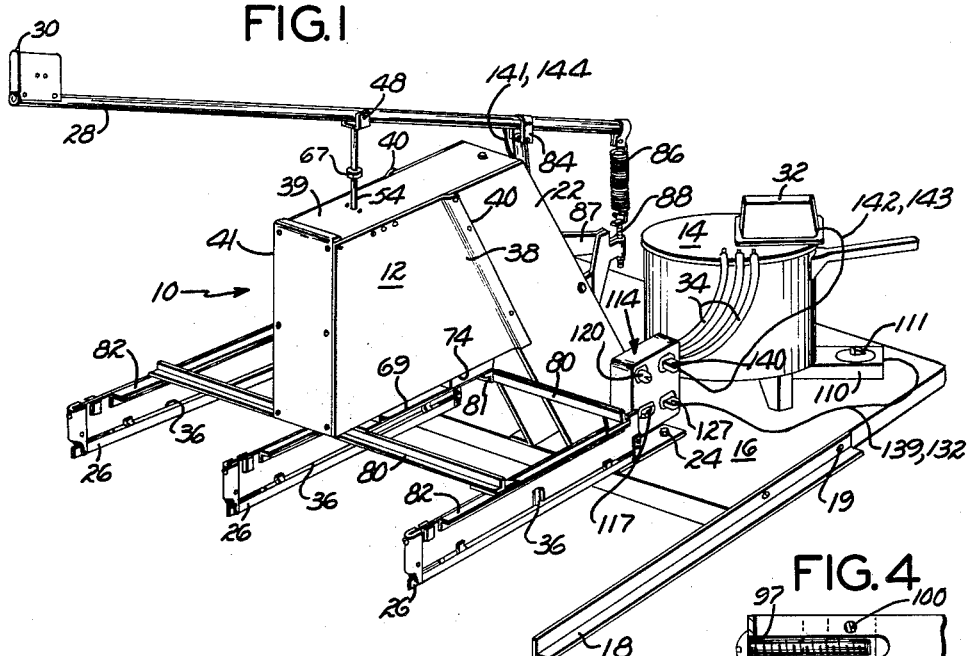
FIG.1
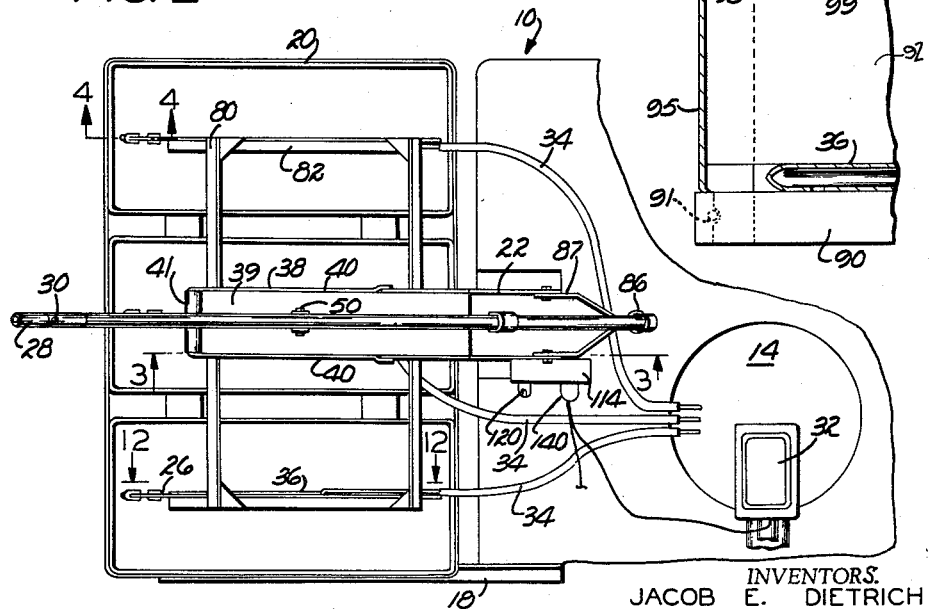
FIG. 2
FIG. 4
INVENTORS.
JACOB E. DIETRICH
EUGENE H. DIETRICH
BY
R. E. Geaugue
ATTORNEY

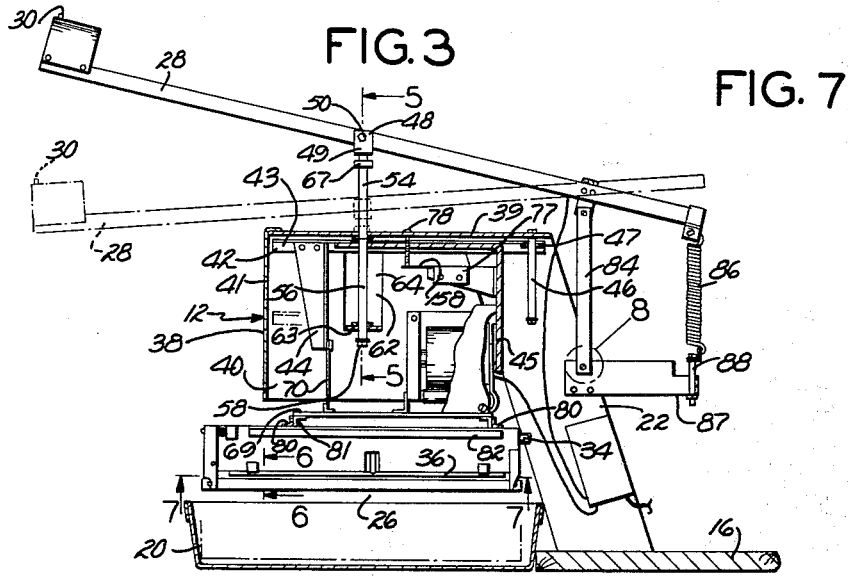

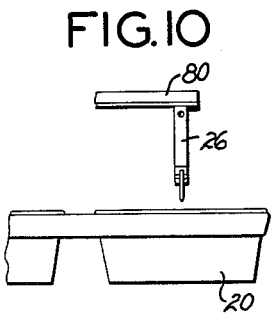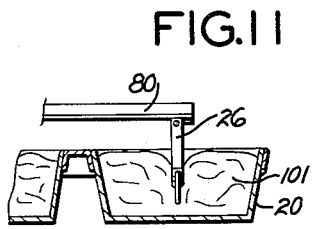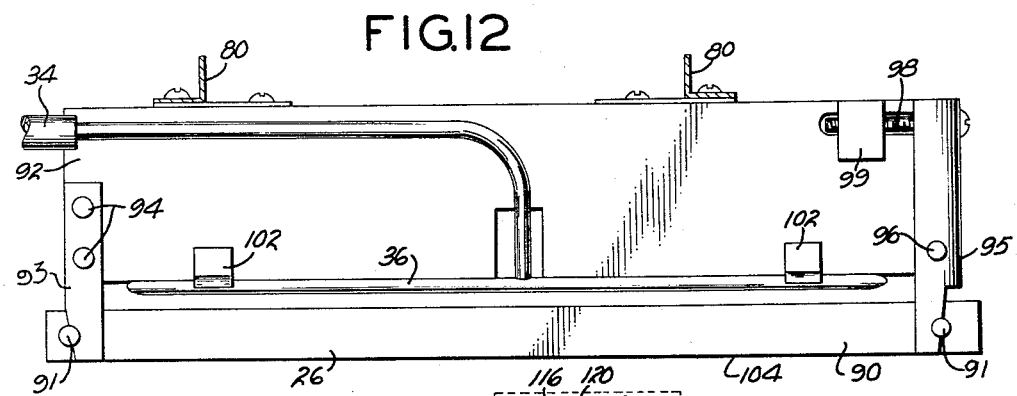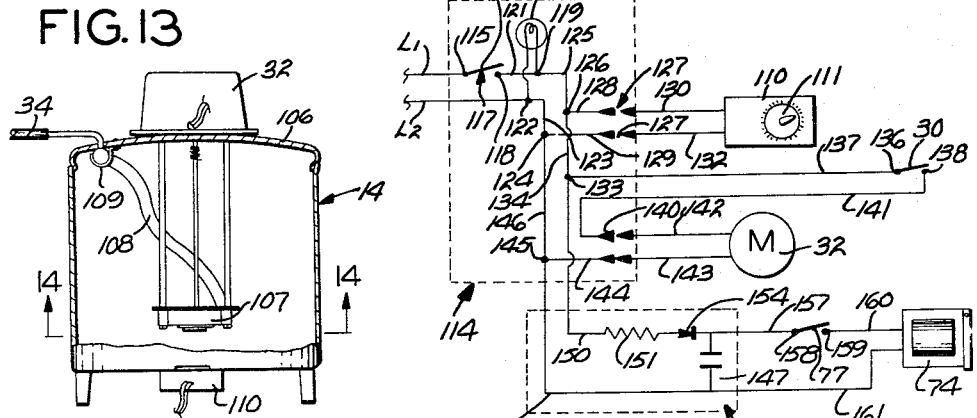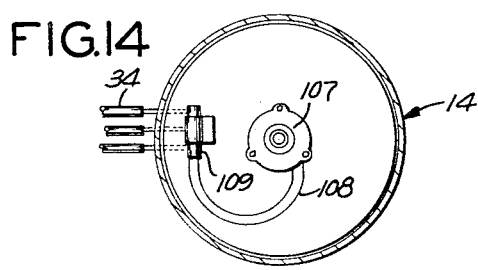
INVENTORS.
JACOB E. DIETRICH
EUGENE H. DIETRICH
BY
ATTORNEY

United States Patent Office 3,176,554
Patented Apr. 6, 1965

3,176,554
LOAF SPLITTER
Jacob E. Dietrich, 18569 Haynes St., Reseda, Calif., and Eugene H. Dietrich, 543 Ave. B, Boulder City, Nev.
Filed Nov. 28, 1962, Ser. No. 240,520
8 Claims. (Cl. 83—11)

This invention relates to a loaf splitter and more particularly to a loaf splitter which may be employed to split a loaf of bread longitudinally after it is proofed but before it is baked.

The baking industry has found a demand for a product known as "split-top bread." This bread is produced by splitting proofed, unbaked loaves longitudinally to a depth near the bottom of the pan. The baked product results in a loaf of bread which appears to have "popped open" along the top longitudinally and which has a fine texture adjacent its centerline. Conventionally, the bread is split with a sharp knife which does not produce an even, accurate cut and which is very time consuming. This results in an end product which is not uniform in appearance. The prior art also employs a spinning wheel to cut the loaf, but the wheel cannot reach the ends of the baking pan. Also, when the spinning wheel enters the bread, cooking oil which must be employed to lubricate the bread, is wiped off. This results in inadequate lubrication and a poor cut.

In view of the foregoing factors and conditions characteristic of prior art methods and apparatus for longitudinally splitting unbaked loaves of bread, it is a primary object of the present invention to provide a new and improved loaf splitter not subject to the disadvantages enumerated above and having a properly lubricated, oscillating blade which is specially designed for splitting loaves of bread longitudinally efficiently, safely and expeditiously.

Another object of the present invention is to provide a loaf splitter which will produce an even and accurate cut longitudinally along a loaf of unbaked bread.

Still another object of the present invention is to provide a device of the type described which will cut proofed loaves of bread to a uniform depth and to the edges of the baking pan.

A further object of the invention is to provide a loaf splitter employing a vibrator motor to oscillate a rectangular blade in such a manner that it will produce an even and accurate longitudinal cut in a loaf of unbaked bread.

Another object of the invention is to provide improved means for tensioning rectangular blades in a frame.

According to the present invention, a heated reservoir of cooking oil and a loaf splitting machine are mounted on a common base. The machine includes a suitable number of rectangular blades which are oscillated by a vibrator while oil is simultaneously pumped from the reservoir and distributed through a manifold over the entire length of the blades as they are lowered into the loaf to be cut. The oil is maintained at the cutting edge of each blade so that the loaf being cut is well lubricated as it is cut. The blades are carried by a frame which is suspended on flexible straps of spring steel so that the vibrator will be effective in oscillating them and each blade is connected to the frame by a unique, tensioning device.

The features of the present invention which are believed to be novel are set forth with particularity in the appended claims. The present invention, both as to its organization and manner of operation, together with further objects and advantages thereof, may best be understood by reference to the following description taken in connection with the accompanying drawings, in which:

FIGURE 1 is a perspective view of a loaf splitter of the invention;
FIGURE 2 is a partial plan view of the device of FIGURE 1 showing some baking pans in position thereunder;
FIGURE 3 is a vertical, cross-sectional view taken along line 3—3 of FIGURE 2;
FIGURE 4 is a vertical, cross-sectional view, on an enlarged scale, of a detail of construction taken along line 4—4 of FIGURE 2;
FIGURE 5 is a vertical cross-sectional view, on an enlarged scale, taken along line 5—5 of FIGURE 3;
FIGURE 6 is a vertical cross-sectional view, on an enlarged scale, of a detail of construction taken along line 6—6 of FIGURE 3;
FIGURE 7 is a bottom view of a detail of construction taken in the direction of the arrows 7—7 in FIGURE 3;
FIGURE 8 is an elevational view, partly in cross-section and on an enlarged scale, taken from the area enclosed within circle 8 in FIGURE 3;
FIGURE 9 is an elevational view of a vibrator motor employed with the device of FIGURE 1;
FIGURE 10 is a schematic view showing the relationship of certain operating parts of the device of FIGURE 1;
FIGURE 11 is a schematic view similar to FIGURE 10 with parts broken away to show a second operating position of the parts;
FIGURE 12 is an elevational view, on an enlarged scale, taken along line 12—12 of FIGURE 2;
FIGURE 13 is an elevational view, with parts broken away to show internal construction, of the oil reservoir of the device of FIGURE 1;
FIGURE 14 is a transverse, cross-sectional view taken along line 14—14 of FIGURE 13; and
FIGURE 15 is a schematic wiring diagram of the device of the invention.

Referring again to the drawings and particularly the two FIGURES 1 and 2, the loaf splitter constituting the present invention, generally designated 10, includes a cutting machine 12 and a cooking oil reservoir 14, both of which are mounted on a common base 16. A pan guide 18 is connected to the base 16 by means of screws 19 and serves to position a set of baking pans 20 under the cutting machine 12.

The cutting machine 12 includes an inverted L-shaped frame 22 which is mounted on the base 16 by means of a plurality of bolts, one of which is shown at 24. A plurality of blade members 26 are connected to frame 22 through means to be hereinafter described and are adapted to oscillate in a horizontal plane while being lowered into pans 20 (FIGURE 11) by means of a lever 28. An electrical switch 30 is mounted on the lever 28 and controls the operation of an oil pump 32, through a circuit to be hereinafter described, to pump oil from reservoir 14 to blade members 26 through conduits 34 and oil distribution manifolds 36.

Referring now to FIGURES 1–3 and 5, the L-shaped frame 22 includes a housing 38 having a top wall 39, side walls 40 and a front wall 41. A reciprocable frame 42 is reciprocably mounted in housing 38 and includes an upper member 43, a first depending leg 44 and a second depending leg 45. A rod 46 is attached to the top wall 39 and passes through an aperture 47 in frame 42 to guide it as it reciprocates within housing 38. The reciprocable frame 42 is linked to the lever 28 by means of a U-shaped member 48 having upstanding legs 49 straddling lever 28 and being pinned thereto by means of a pin 50. The bight portion 51 of U-shaped member 48 is apertured to receive a bolt 52 which is rigidly connected to member 48 by means of a nut 53. An upper tubular member 54 encompasses bolt 52 and has one end abutting the underside of bight portion 51 and its other end abutting a pair of washers 55 which are rigidly affixed to the upper side of upper member 43. A lower tubular member 56 encompasses the lower end of bolt 52 and has one end abutting the underside of upper member 43 and its other end abutting a washer 57 which engages a nut 58 on the lower end of bolt 52. When the nuts 53 and 58 are tightened, the tubular members 54 and 56 tightly clamp the frame 42 and the U-shaped member 48 together for reciprocation through lever 28. An annular bushing 59 having a central aperture 60 is rigidly affixed to the underside of top wall 39 in alignment with an aperture 61 to guide the upper tubular member 54. A U-shaped bracket 62 having a bight portion 63 and upstanding legs 64 is rigidly affixed to the underside of top wall 39 and carries a bushing 65 in its bight portion 63 which is apertured at 66 in alignment with the bushing 65 to guide the lower tubular member 56. An annular stop member 67 is keyed to the upper tubular member 54 by means of a set screw 68 to control the stroke of frame 42. A base plate 69 is suspended from the reciprocable frame 42 by means of a flexible strap 70, which is rigidly affixed to the depending leg 44, and a spring steel member 71 (FIGURES 3 and 9) which is bolted to depending leg 45 by means of vertically aligned bolts 72 and 72a and nuts 73 and 73a.

A conventional vibrator motor 74 is rigidly connected to the base plate 69 by means of an L-shaped bracket 75 and is connected to the spring steel member 71 by means of brackets 76 in conventional manner for stroking vibrator 74 in one direction. A microswitch 77 is attached to leg 45 and actuates vibrator 74 as it is lowered away from a bolt 78 which opens movable contact 158 when the frame 42 is in its upper position. Vibrator motor 74 imparts a force to base 69 in one direction only and spring 71 imparts a force in the opposite direction which returns base plate 69.

A rail 80 is rigidly connected to each end of the base plate 69 by means of angle irons 81 and supports the blade members 26 through L-shaped brackets 82. Thus, the blade members 26 are swingably supported by reciprocable frame 42 through flexible strap 70, vibrator 74, plate 69, rail 80 and brackets 82.

The lever 28 is pivotally connected intermediate its ends to the L-shaped frame member 22 by means of a link 84 which pivots on a pin 85 (FIGURE 8) and is spring biased to an upward position by means of a spring 86 having one end connected to the lever 28 and its other end connected to the frame member 22 through a bracket 87. The tension of spring 86 may be adjusted by means of a bolt 88 connecting the spring 86 to the bracket 87.

Referring now to FIGURES 4, 6 and 12, each blade member 26 includes a spring-steel cutting blade 90 having pins 91 transversely mounted near each end thereof. Each blade 90 is supported from a frame member 92 by means of a first U-shaped, bifurcated member 93, which is rigidly affixed to one end of the frame member 92 by means of rivets 94, and a second U-shaped, bifurcated member 95, which is swingably mounted on the other end of frame member 92 by means of a pin 96. The end of the bifurcated member 95 which is remote from the blade 90 includes a bolt receiving aperture 97 through which a bolt 98 extends. The bolt 98 threadedly engages a split nut 99 which is rigidly affixed to the frame member 92 by means of rivets 100. Each blade 90 is tensioned by tightening bolt 98 so that the bifurcated member 95 will pivot about pin 96 in a counterclockwise direction, as viewed in FIGURE 12. The blade tensioning means is an important feature of the invention because it permits tensioning the blade 90 with an apparatus which presents a minimum surface to proofed loaves of bread 101 (FIGURE 11) when the blade assembly 26 is lowered therein.

Each oil distribution manifold 36 is connected to the lower edge of a frame member 92 by means of clips 102 superjacent a blade 90. The underside of each manifold 36 carries a plurality of oil outlet ports 103 (FIGURE 7) which uniformly distribute oil along the upper edge of blade 90 in such a manner that it will flow uniformly downwardly to the cutting edge 104 of the blade 90 (FIGURE 6).

Referring now to FIGURES 13 and 14, the oil supply reservoir 14 includes a cover 106 in which the pump 32 is mounted. The pump 32 includes an impellor 107 which depends into the reservoir 14 and which pumps heated cooking oil, not shown, from the reservoir 14 through a discharge conduit 108 into a manifold 109 from whence the oil flows through conduits 34 to oil distribution manifolds 36. Oil may be heated in the reservoir 14 by means of electrical heating element 110 which is controlled by a thermostat 111 (FIGURE 1).

Referring now to FIGURE 15, electrical power is supplied to the loaf splitter through leads $L_1$ and $L_2$ which enter an outlet box 114. Line $L_1$ is connected to a terminal 115 on the pole 116 of a single-throw master switch 117. The fixed contact 118 of the switch 117 is connected to a terminal 119 of an indicator lamp 120 through a lead 121. The line $L_2$ is connected to the other terminal 122 of lamp 120. A lead 123 carries power from terminal 122 to a terminal 124 and a lead 125 carries power from terminal 119 to a terminal 126. The terminal 126 is connected to one female side of a plug 127 through lead 128 and terminal 124 is connected to the other female side of plug 127 through a lead 129. One male side of plug 127 is connected to thermostat 111 through a conductor 130 and the other male side of plug 127 is connected to thermostat 111 through a conductor 132. Power is carried from terminal 126 to a terminal 133 through a lead 134. Terminal 133 is connected to the movable contact 136 of switch 30 through a line 137. The fixed contact 138 of switch 30 is connected to one female side of a plug 140 through a line 141. One male side of the plug 140 is connected to the oil pump 32 through a lead 142. The other male side of the plug 140 is connected to the oil pump 32 through a lead 143. The other female side of plug 140 is connected through a lead 144 to a terminal 145 which, in turn, is connected with terminal 124 through a lead 146. The terminal 145 is connected to one side of a capacitor 147 through a line 149. The terminal 133 is connected to the other side of capacitor 147 through a line 150, a fixed resistor 151 and a diode 154. The capacitor 147, resistor 151 and diode 154 comprise a half-wave rectifier 155 which is connected to one side of the vibrator 74 through a lead 157, the movable contact 158 and fixed contact 159 of the microswitch 77 and line 160. The rectifier 155 is connected to the other side of vibrator 74 through a lead 161.

Operation of the device will be readily understood. Master switch 117 is closed completing a circuit to lamp 120 and heating element 110. The heating element 110 brings the cooking oil, not shown, in oil reservoir 14 up to its operating temperature. Proofed loaves of bread 101 in pans 20 are positioned under blade members 26 and lever 28 is depressed lowering blades 90 into loaves 101. When switch 77 comes out of contact with bolt 78, vibrator 74 is energized and oscillates blades 90 at a frequency of approximately 3600 times per minute. At the same time, switch 30 is closed by the operator to energize oil pump 32 which pumps cooking oil from reservoir 14 to oil distributing manifolds 36 through conduit 108, manifold 109 and conduits 34. Oil flows out through oil outlet ports 103 and down blades 90 to cutting edges 104. Lever 28 is depressed sufficiently to force oscillating blades 90 down into loaves 101. The stop member 67 may be adjusted to stop the downward travel of blades 90 at a predetermined level, which is usually from about ½ to ¾ inch from the bottom of pans 20. The oscillating stroke of blades 90 is of sufficient amplitude to split the loaves 101 lengthwise from their front edge to their rear edge.

What is claimed is:

1. Apparatus for splitting unbaked loaves of bread in a plurality of pans connected together in a fixed group, said apparatus comprising:
 a base having guide means for positioning a group of said pans in a predetermined location in the same plane as said base and adjacent thereto;
 a cutting machine mounted on said base, said cutting machine including a first frame member extending superjacent said pans for reciprocation in a vertical plane;
 a second frame member flexibly connected to said first frame member for oscillation in a horizontal plane;
 blade means rigidly connected to said second frame member and having a blade positioned over each pan of said group;
 a lever linked to said first frame member for lowering said blades into said pans;
 a vibrator motor connected to said second frame member for oscillating said blades in a horizontal plane as they are lowered into said pans;
 an oil reservoir mounted on said base adjacent said cutting machine;
 a pump mounted in said reservoir for pumping oil therefrom; and
 conduit means connecting said pump to each of said blades for lubricating them as they are lowered into said pans.

2. A blade member for a loaf splitting machine comprising:
 a frame having a leading edge and a trailing edge;
 a first U-shaped meber straddling said trailing edge and being rigidly affixed to said frame, said first U-shaped member including a bifurcated portion depending from said frame;
 a second U-shaped member straddling said leading edge and being pivotally mounted on said frame, said second U-shaped member having a bifurcated portion depending from said frame;
 a tensionable blade having its ends straddled by said bifurcated portions and being connected thereto; and
 means for pivoting said second U-shaped member with respect to said leading edge to tension said blade.

3. A device for splitting a loaf of unbaked bread dough while in a baking pan comprising:
 frame means located above said loaf and movable up and down relative to said loaf;
 blade means positionable between said loaf and said frame means;
 spring means for supporting said blade means on said frame means for vibrating movement in a direction transverse to the direction of movement of said frame means;
 means for moving said frame means to lower said blade means into said loaf and split said dough;
 vibrator means operative on said blade means to vibrate said blade means as said blade means is lowered into said loaf; and
 means for selectively placing cooking oil on said blade means as said blade means is lowered into said dough to lubricate the loaf at said split in a desired amount for splitting and baking.

4. A device as defined in claim 3 wherein said blade means comprises a cutting blade extending lengthwise of said pan and shorter than said pan to permit said vibrating movement while said blade is lowered into said pan.

5. A device as defined in claim 4 wherein said oil placing means comprises an oil distribution manifold supported above and along said cutting blade, said manifold having opening means for discharging oil onto said blade along the length thereof so that said oil flows down said blade to its cutting edge and onto said dough; and means for selectively controlling the supply of oil to said manifold to control the amount of oil applied to said blade and dough during splitting of said loaf.

6. A device as defined in claim 5 wherein said controlling means comprises a reservoir containing said oil and connected with said manifold by a connecting passage; a pump in the said connecting passage; and switch means for controlling the operation of said pump.

7. A device as defined in claim 6 having manually operable lever means for moving said frame means and lowering said cutting blade into said dough, said switch means being located on said lever means for selective manual control as said lever means is moved.

8. A device for splitting loaves of bread dough while in baking pans comprising:
 frame means located above said loaves and movable up and down relative to said loaves;
 blade means positionable between said loaves and said frame means;
 spring means for supporting said blade means on said frame means for vibrating movement in a direction transverse to the direction of movement of said frame means;
 said blade means comprising a plurality of cutting blades supported substantially parallel to one another, each blade being located along the length of a baking pan located below said blade;
 means for moving said frame means to lower said blade means into said loaves and split said dough;
 vibrator means operative on said blade means to vibrate said blade means as said blade means is lowered into said loaves; and
 means for selectively placing cooking oil on said blade means as said blade means is lowered into said bread dough to lubricate the loaves at the splits in a desired amount for splitting and baking.

References Cited in the file of this patent

UNITED STATES PATENTS

| 313,643 | Barney | Mar. 10, 1885 |
| 1,502,120 | Rasmussen | July 22, 1924 |
| 2,231,433 | Blum | Feb. 11, 1941 |
| 2,598,784 | Gommel | June 3, 1952 |
| 2,797,679 | Blum | July 2, 1957 |
| 3,073,201 | Thumim | Jan. 15, 1963 |

FOREIGN PATENTS

| 562,712 | Italy | May 17, 1957 |